United States Patent [19]

Oskam

[11] Patent Number: 5,331,865
[45] Date of Patent: Jul. 26, 1994

[54] ADJUSTABLE HANDLEBAR STEM

[75] Inventor: Willem Oskam, Heerenveen, Netherlands

[73] Assignee: Batavus B.V., Heerenveen, Netherlands

[21] Appl. No.: 913,113

[22] Filed: Jul. 14, 1992

[51] Int. Cl.$^5$ .............................................. G05G 1/14
[52] U.S. Cl. ..................................... 74/551.3; 74/551.4
[58] Field of Search ............... 74/551.1, 551.3, 551.4, 74/551.5, 551.6, 551.7; 403/69, 70, 71, 82, 84, 91, 96, 102, 103

[56] References Cited

U.S. PATENT DOCUMENTS

| | | | |
|---|---|---|---|
| 590,672 | 9/1897 | Simons | 403/70 |
| 671,647 | 4/1901 | Field | 74/551.6 |
| 689,217 | 12/1901 | Palmer | 74/551.3 |
| 1,030,383 | 6/1912 | Buschman | 403/71 |
| 1,578,634 | 3/1926 | Borgmann | 403/71 |
| 1,584,314 | 5/1926 | Mamiya | 74/551.3 |
| 3,081,114 | 3/1963 | Esty | 403/71 |
| 4,568,121 | 2/1986 | Kashima | 403/82 X |
| 4,729,255 | 3/1988 | Moulton | 74/551.3 |
| 5,028,071 | 7/1991 | Bolam | 403/84 X |
| 5,138,900 | 8/1992 | Hals | 74/551.3 X |
| 5,241,881 | 9/1993 | Chen | 74/551.3 |

FOREIGN PATENT DOCUMENTS

| | | | |
|---|---|---|---|
| 1003619 | 2/1957 | Fed. Rep. of Germany | 74/551.3 |
| 375199 | 7/1907 | France . | |
| 463494 | 2/1914 | France . | |
| 54273 | 9/1948 | France . | |
| 2430883 | 2/1980 | France . | |
| 399794 | 11/1942 | Italy | 74/551.3 |
| 8507 | of 1886 | United Kingdom | 74/551.3 |
| 503237 | 4/1939 | United Kingdom | 74/551.4 |
| 9003302 | 4/1990 | World Int. Prop. O. . | |

Primary Examiner—Leslie A. Braun
Assistant Examiner—Ryan W. Massey
Attorney, Agent, or Firm—Weingarten, Schurgin, Gagnebin & Hayes

[57] ABSTRACT

A handlebar stem is provided having a shank and a front extension for mounting a handlebar. The front extension extends at an angle relative to the shank. Extending through the front extension from the shank is a bolt for fixing the front extension relative to the shank. The handlebar stem is light, slender and is of simple construction with a minimum of projecting parts.

14 Claims, 4 Drawing Sheets

ADJUSTABLE HANDLEBAR STEM

FIELD OF THE INVENTION

This invention relates to a handlebar stem for connecting a handlebar with a means to be steered, which handlebar stem comprises a shank, a front extension extending at an angle relative to the shank, said front extension comprising means for mounting the handlebar, while the angle at which the front extension extends relative to the shank is adjustable and the handlebar stem comprises a bolt to be inserted through the shank in longitudinal direction for clamping the handlebar stem in a means to be steered.

Such a handlebar stem is known from French Patent Specification 54.273.

This known handlebar stem comprises a pin extending transversely to the shank of the handlebar stem and the front extension is provided with a passage whose cross-sectional area can be reduced by tightening a bolt so as to clamp the front extension to the pin extending tranversely to the shank. This bolt extends diagonally through the front extension and simultaneously operates the passage for the handlebar, so that upon tightening the bolt, both the handlebar and the shank are fixed relative to the front extension.

Drawbacks of this known handlebar stem are that its construction is complicated and it is heavy. Moreover, the boll for fixing the front extension relative to the shank and the pin extending transversely to the shank are projecting members involving serious risk of injury.

SUMMARY OF THE INVENTION

It is an object of the present invention to provide a handlebar stem in which these disadvantages have been obviated to a considerable extent in that it is of simple construction and can be of relatively light and slender design without any members projecting in many directions.

According to the present invention, this object is accomplished in that in a handlebar stem of the type described hereinabove the bolt extends through the front extension, such a manner that the front extension can be fixed relative to the shank by means of the bolt.

Because the front extension can be clamped relative to the shank by the bolt extending through the shank of the handlebar stem, clamping the front extension does not require the provision of a bolt extending from the area of the handlebar to the area of the shank. Because, furthermore, the bolt extends through the front extension, the latter can be clamped direct against the shank, without an intermediary pin extending transversely to the shank. Thus, the handlebar stem according to the invention can be of light, slender and simple construction with a minimum of projecting parts. The invention can be further embodied by a shank or a front extension for use as parts of a handlebar stem according to the invention.

DESCRIPTION OF THE DRAWINGS

One embodiment of the invention will now be further illustrated and explained, by way of example, with reference to the accompanying drawings, in which.

DESCRIPTION OF THE PREFERRED EMBODIMENT

Figure 1:
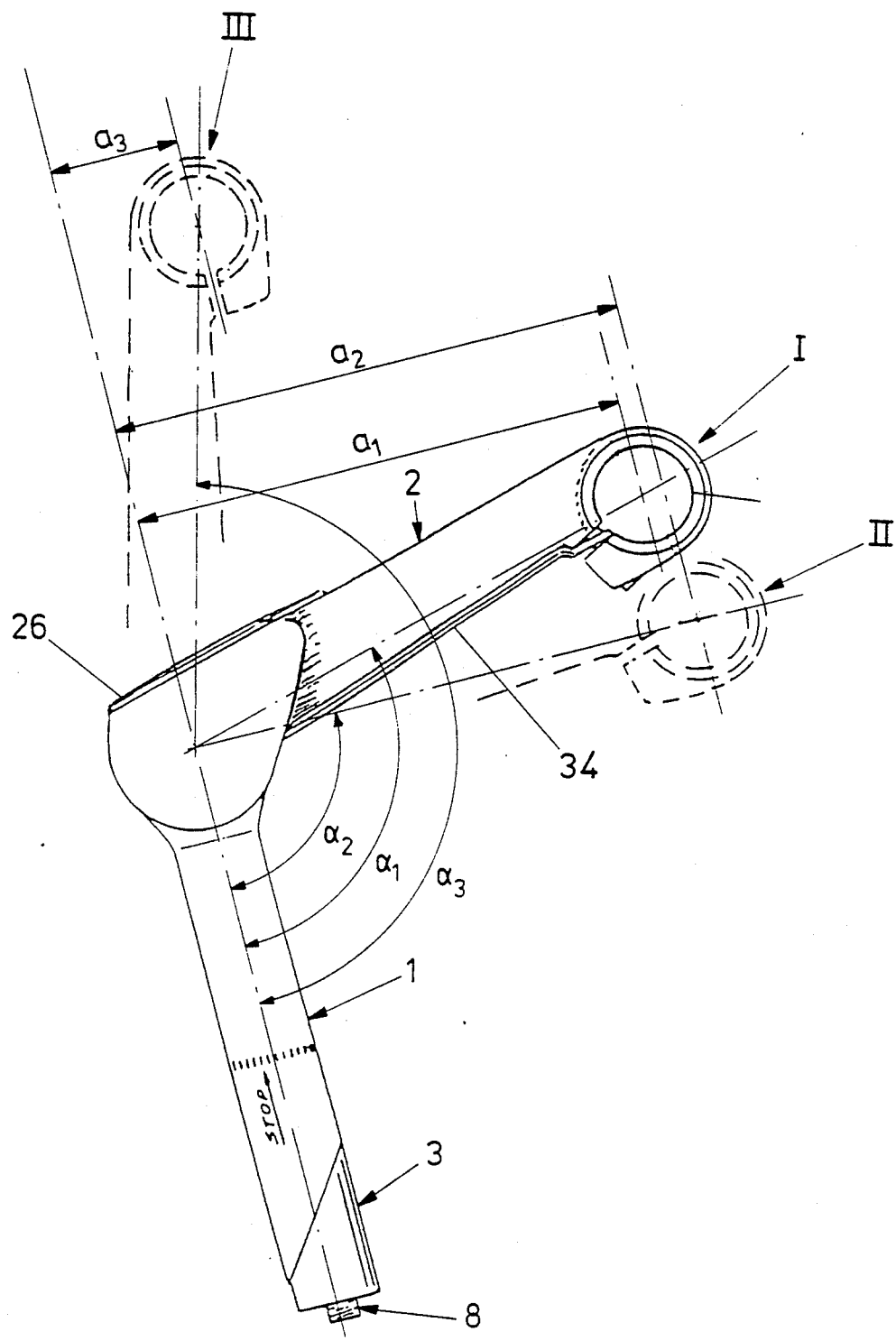
FIG. 1 is a side elevation of a handlebar stem according to the invention.

The handlebar stem according to the embodiment shown in the drawings comprises a shank 1 and a front extension 2. Resting against the shank is an expansion plug 3 provided with internal thread 4 and a bevelled surface 5 cooperating with a bevelled end 6 of the shank 1. A thread 7 of an expansion bolt 8 engages with the internal thread 4. By tightening the expansion bolt 8 the expansion plug is drawn against the shank 1 while the surface 5 and the bevelled end 6 cooperate so as to move the expansion plug in transverse direction relative to the shank 1, so that the shank 1 can be clamped in a hole of a means to be steered, such as the extension of the front fork of a bicycle, in order to connect the handlebar to the means to be steered.

The front extension 2 comprises an aperture 9 in which a handlebar can be clamped by tightening a bolt 10. Such a construction is generally known and therefore not discussed in further detail for the sake of brevity.

The front extension 2 extends at an angle $\alpha_1$ (see FIG. 1) relative to the shank 1, so that a handlebar can be mounted at a distance $a_1$, measured from the centre of the handlebar adjacent the extension 2 to the axis of shank 1. In the known handlebar stems with a fixed front extension, the arrangement of a handlebar further towards the rear or the front requires that a handlebar stem be mounted which has a correspondingly longer or shorter front extension. With the handlebar stem according to the present embodiment, however, the extension of the front extension 2 relative to the shank 1 can be adjusted, so that a handlebar, measured as indicated above, can be mounted at distances varying between a distance $a_3$ (if extension 2 is fixed at an angle $\alpha_3$) and a distance $a_2$ (if extension 2 is fixed at an angle $\alpha_2$) from the axis of the shank. This enables the position of the handlebar to be changed in forward and rearward direction without mounting a different handlebar stem. A particular advantage hereof is than it enables the position of the handlebar to be adjusted in forward and rearward direction for a given desired height of the handlebar in a vehicle in a standard design ex-works.

In the position indicated by Roman numeral II, the handlebar is mounted in an extreme forward position; in the position indicated by the Roman numeral III, the handlebar is mounted in an extreme rearward position.

The distance by which the extension 2 extends transversely to the shank 1 is adjustable owing to the adjustability of angle at which the extension 2 extends relative to the shank 1.

Figure 2:
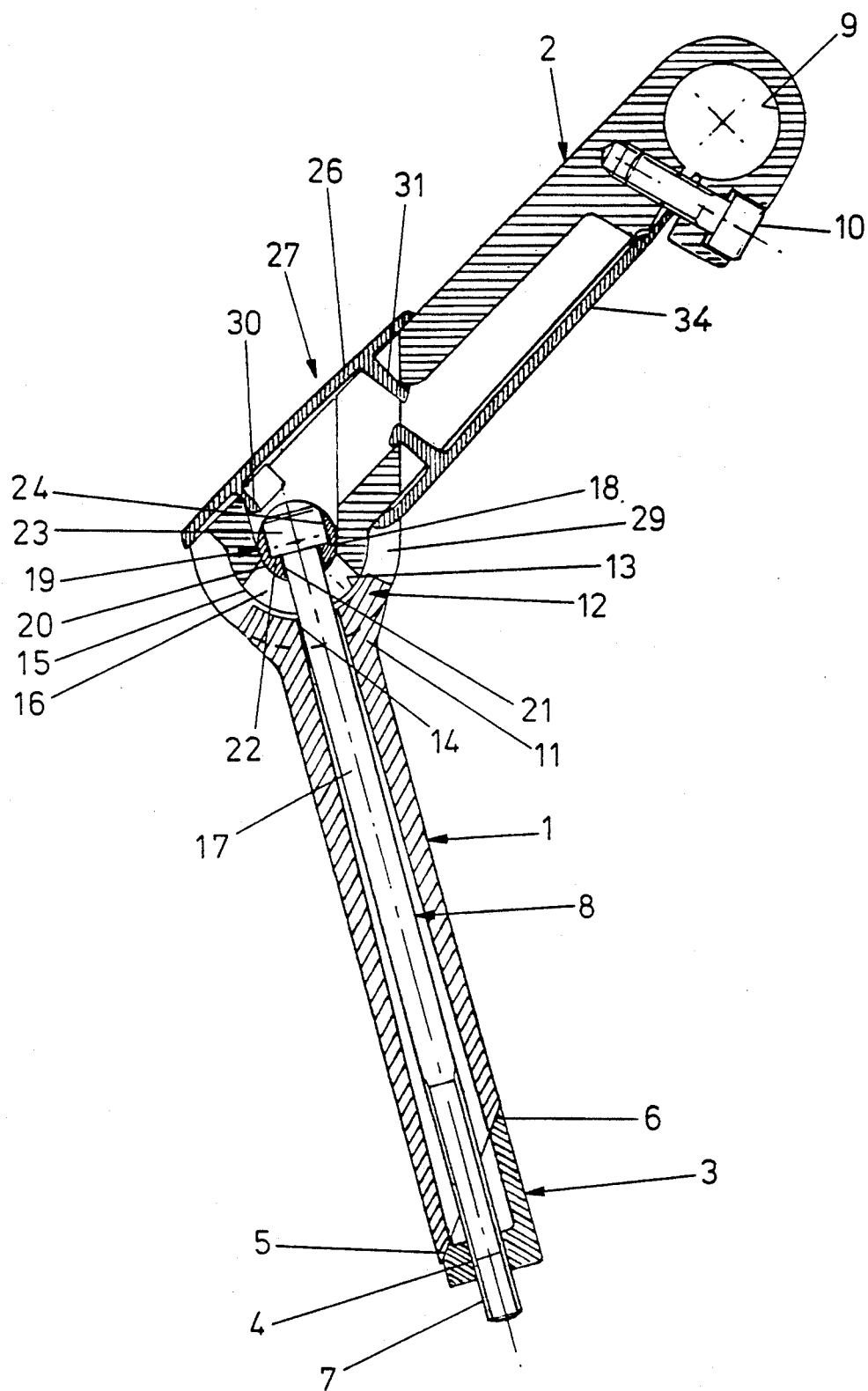
FIG. 2 is a sectional side elevation of the handlebar stem according to FIG. 1.

As appears in particular from FIG. 2, the expansion bolt 8 extends through the front extension 2, in such a manner that the front extension 2 can be clamped relative to the shank 1 by the expansion bolt 8. This offers the advantage that both the axial position of the handlebar seem and the angle of the front extension 2 relative to the shank 1 can be fixed and released by operating a single securing member. Furthermore, the handlebar stem according to the invention can accordingly be light, slender and of simple construction with a minimum of projecting parts.

In the handlebar stem according to the embodiment shown, one end 11 of the shank 1 comprises a support 12 with a curved surface 28 facing away from the shank 1, an aperture 14 through which extends the expansion bolt 8 in longitudinal direction of the shank 1. The front extension comprises a curved surface 29 which, in a fixed position of the front extension 2, extends coaxially with the curved surface 28 of the support 12 and is in contact therewith. The front extension 2 further comprises a sloe 16 extending in circumferential direction, through which extends the shank 17 of the expansion bolt 8.

The mutually contacting, coaxial, curved surfaces 28 and 29 of the support 12 and the front extension 2, respectively, provide a stable support for the front extension 2 relative to the shank 1, irrespective of the position of the front extension relative to the shank 1. By virtue of the surfaces 28 and 29 being shaped in mutual conformity, a uniform distribution of the pressure across the surfaces 28 and 29 is obtained.

The support 12 and the front extension 2 each have two of such curved surfaces 28 and 29, which are coaxial and of mutually opposite conicity and extend through a common sector relative to the common axis. As appears from FIG. 2, the front extension 2, in a fixed position thereof relative to the shank 1, has only its curved conical surfaces 29 engaging with the curved conical surfaces 28 of the support 12 and there is a space between remaining parts of the front extension 2 and the shank 1.

Because the pairs of surfaces 28 and 29 are each of mutually opposite conical configuration, they are each of mutually opposite oblique orientation relative to the line of action of the pressure force exerted by the expansion bole 8, so that upon tightening of the bolt 8, a wedging action is generated between the surfaces 28 and 29 being pressed against each other and the normal force exerted by the surfaces 28 and 29 on each other is greater than the force exerted by the expansion bolt 8. Thus a particularly reliable fixation of the front extension 2 relative to the shank 1 can be obtained while the mutually opposite angle relative to the line of action of the expansion bolt 8 of each of the surfaces 28 and 19 of the support 12 and the front extension 2, respectively, effects a centering of the front extension 2 relative to the support 12 upon tightening of the expansion bolt 8.

To provide advantageous wedging action it is important that in a conventional expansion construction, on the one hand, such large normal forces between the surfaces 28 and 29 are obtained that a reliable fixation of the front extension 2 relative to the shank 1 is obtained, even when these surfaces 28 and 29 are entirely smooth so as to obtain stepless adjustability and, on the other, the normal forces are limited to such an extent that a light, compact construction will suffice to resist the forces exerted. An advantageous wedging action can be obtained if the conical surfaces 28 and 29 each form a surface portion of a cone having an apex angle of between 100° and 150° and in particular of approximately 120°.

Figure 3:
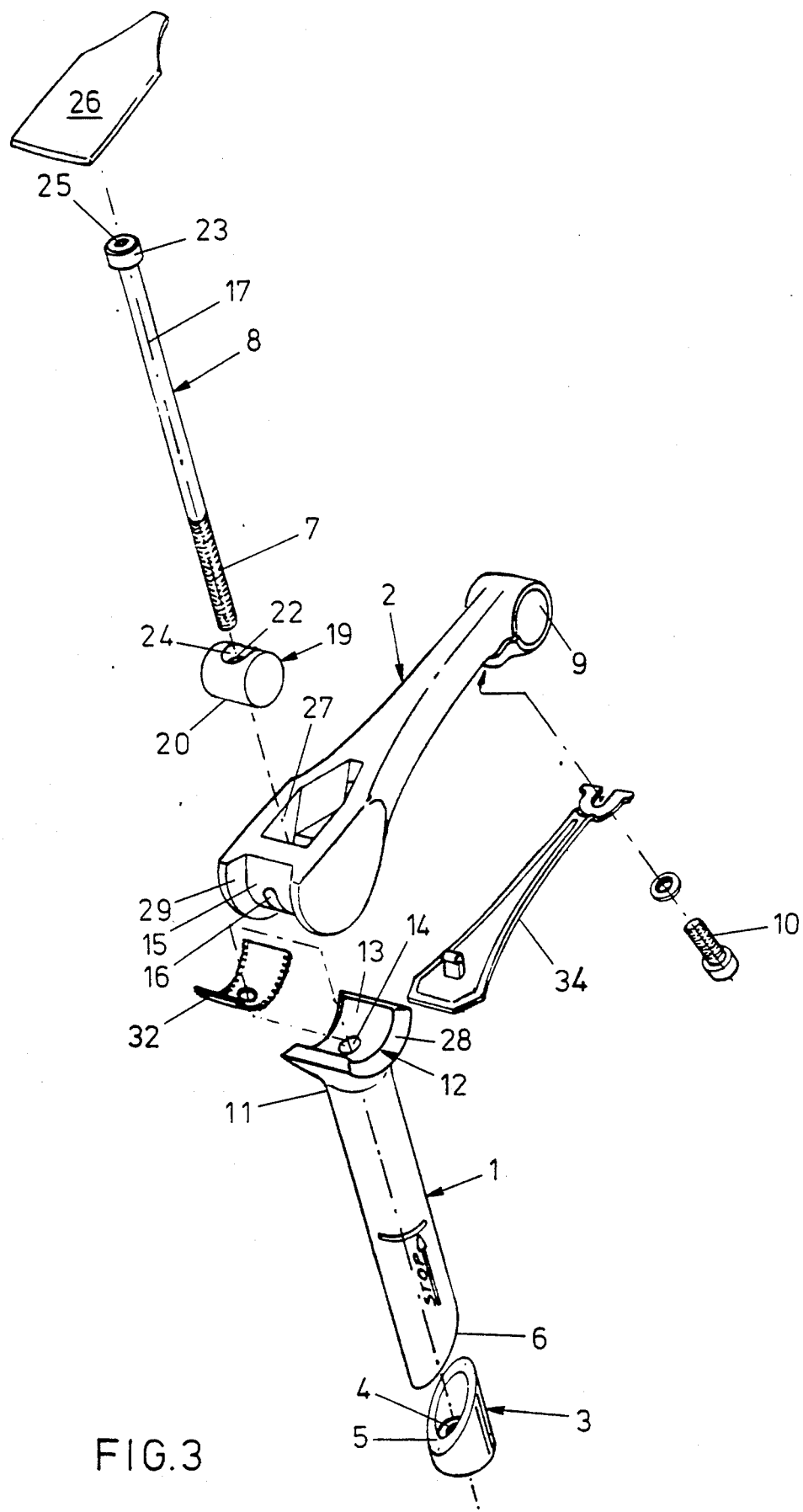
FIG. 3 is a perspective exploded view of the handlebar stem shown in FIGS. 1 and 2.
Figure 4:
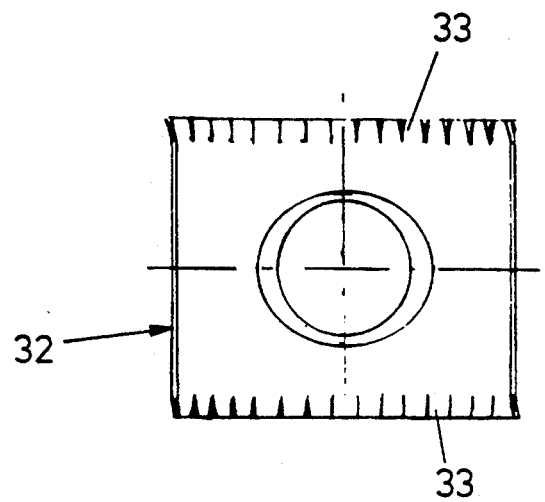
FIG. 4 is a top plan view of a plate as shown in FIG. 3.
Figure 5:
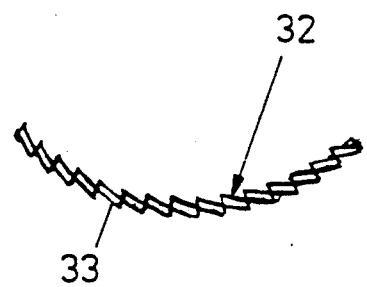
FIG. 5 is a side elevation of the plate shown in FIG. 4.

A curved and toothed plate 32 (see FIGS. 3, 4 and 5), made for instance from Spring steel, my be arranged between coaxial surfaces 13 and 15 or 28 and 29 of the support 12 and the front extension 2, respectively. The plate shown is arranged to be positioned between the cylindrical surfaces 13 and 15.

Thus, at a certain force exerted by the bolt 8, a good fixation of the front extension 2 relative to the shank can be obtained. The thickness of the plate 32 can be chosen such that, when tightening the bolt 22, the conical surfaces 28 and 29 take care only of the centering of the front extension 2 relative to the shank 1. In that case, substantially the entire clamping force is transmitted via the plate 32. It is also possible to design the handlebar stem in such a manner that when the bolt 8 is tightened, the clamping force is transmitted both via the conical surfaces 28 and 29 and via the plate 32.

The teeth 33 of the plate 32 are preferably directed partly in one direction and partly in the oppositie direction. Thus, a better fixation is obtained than when each tooth is designed for fixation in both directions with tooth flanks oriented at the same angles.

In the plate 32 according to the embodiment shown, the teeth 33 on one side are oriented in one direction and on the other side in the opposite direction.

To improve the fixation of the front extension 2 relative to the support, it is further possible to texture the coaxial surfaces 13 and 15 and 28 and 29 clamped towards each other in a fixed position of the handlebar stem. The cooperating projections and recesses of the texture preferably extend in axial direction.

According to the embodiment shown, the curved surface 29 of the front extension 2, resting against the curved surface 28 of the support 12, is convex. The front extension 2 comprises a concave surface 18, coaxial with the convex surface 29 referred to, in the area of the sector of circle of the convex surface 29. Resting against the concave surface 18 of the front extension 2 is a clamping member 19 with a convexly curved surface 20 extending coaxially with the concave surface 18 of the front extension 2. This clamping member 19 is provided with an aperture 21 through which extends the shank 17 of the expansion bolt 8 and with a support surface 22, facing away from the convex surface 20, for a head 23 of the expansion bolt 8.

Clamping member 19, resting against the concave surface 18 of the front extension 2, enables a uniformly distributed introduction into the front extension 2 of the force exerted by the expansion bolt 8, irrespective of the position of the front extension 2 relative to the shank 1. Because the curved surfaces 29 and 18 of the front extension 2 extend concentrically in the same sector of a circle, a uniform wall thickness of the front extension in this area can be obtained, so that at least this portion of the front extension 2 is relatively simple to manufacture.

It is also possible, however, to design a convex cylindrical surface of the front extension to extend roundabout and to arrange for the expansion bolt, with interposition of an adapted clamping member, to engage with a part of the convex cylindrical surface facing away from the support.

According to the embodiment shown, the clamping member 19 is designed as a clamping roll and the support surface 22 is formed by the end of a bore 24 which is coaxial with the aperture 21, the bore 24 having a diameter adjusted for receiving the head 23 of the expansion bolt 8. This head 23 has an internal recess 25—a hexagonal socket according to the embodiment shown—for tools.

This embodiment of the clamping member 19 offers, on the one hand, a good bending stiffness and strength of the clamping member 19 and, on the other, a countersunk position of the head 23 of the expansion bolt 8, so that it projects from the concave cylindrically curved surface 18 of the front extension 2 only by a limited distance. The internal recess 25 of the head 23 permits the bore 24 to be designed with a limited diameter because a tool can engage the head 23 of the expansion bolt 8 from the inside. The design of the clamping member as a clamping roll 19 further offers the advantage that it can be made from round bar stock in a simple manner.

According to the present embodiment, the concave surface 18 of the front extension 2 is located in a recess 27 of the front extension 2, which recess 27 is closed by a cover 26. The head 23 of the expansion bolt 8 can thus be entirely countersunk in the front extension 2, so that an appealing smooth appearance is obtained and the risk of injury through projecting parts is limited. Further, the cover 26 prevents the accumulation of dirt in the recess 27.

The cover 26 is fitted with snap projections 30 and 31 adapted to engage with members of the front extension 2 so as to retain the cover.

In the embodiment shown, the front extension 2 has a substantially U-shaped cross-section, while of the part on the side of the shank 1 the open side is directed away from the shank 1, and of the part that is remote from the shank 1 the open side is directed towards the shank 1. Because the front extension 2 is designed with a substantially U-shaped cross section, it has a substantially clearing form, so that manufacture as a casting is simplified, while the U-shaped cross section at the same time provides high bending stiffness of the front extension 2. The fact that the open side of the part of the front extension 2 on the side of the shank 1 faces away from the shank 1 permits the recess 27 to be made therein. The open side of the part of the front extension 2 that is remote from the shank 1 and faces away therefrom provides a closed top of the front extension 2 so that a smooth finish is obtained.

The part of the front extension 2 remote from the shank 1 and having a U-shaped cross-section is fitted with a bottom cover 34, so that the bottom part of the front extension 2 has a smooth finish.

I claim:

1. A handlebar stem for connecting a handlebar with a means to be steered, which handlebar stem comprises a shank, a front extension extending at an angle relative to the shank, said front extension comprising means for mounting the handlebar, while the angle at which the front extension extends relative to the shank is adjustable and the handlebar stem comprises a bolt to be inserted through the shank in longitudinal direction for clamping the handlebar stem in a means to be steered, in which the bolt extends through the front extension, in such a manner that the front extension can be fixed relative to the shank by means of the bolt.

2. A handlebar stem according to claim 1, in which an end of the shank comprises a support having a curved surface facing away from the shank and an aperture through which extends the bolt, while the front extension comprises a curved surface which, in a fixed position of the front extension, extends coaxially with said curved surface of the support and is clamped towards it, and comprises a slot extending in circumferential direction, through which extends the shank of the bolt.

3. A handlebar stem according to claim 2, in which the support and the front extension each have two of said curved surfaces which are coaxial and of mutually opposite conicity, extend through a common sector relative to the common axis, and are at least partly located opposite each other when the front extension is in a fixed position relative to the shank.

4. A handlebar stem according to claim 3, in which the conical surfaces each form a surface portion of a cone having a same apex angle of 100°-150°.

5. A handlebar stem according to claim 4, in which the apex angle is approximately 120°.

6. A handlebar stem according to claim 2, in which in fixed condition of the handlebar stem, mutually clamped curved surfaces of the front extension and the support are cylindrically shaped.

7. A handlebar stem according to claim 6, in which said curved surfaces are provided with a texture.

8. A handlebar stem according to claims 2, comprising a curved toothed plate arranged between the mutually clamped concentrically curved surfaces of the support and the front extension.

9. A handlebar stem according to claim 8, in which said curved surfaces are provided with a texture.

10. A handlebar stem according to claim 9, in which the concave surface of the front extension is located in a recess in the front extension, which recess is closed by a cover.

11. A handlebar stem according to claim 10, in which the front extension has a substantially U-shaped cross section, while the open side of the part on the side of shank is directed away from the shank and the open side of the part remote from the shank is directed towards the shank.

12. A handlebar stem according to claims 2, in which the curved surface of the front extension, resting against a curved surface of the support, is convex, the front extension comprises a concave surface, coaxial with said convex surface, in the area of the sector of circle of said convex surface, a clamping member having a convex surface rests against the concave surface of the front extension, said surface extending coaxially with said concave surface of the front extension, said clamping member being provided with an aperture through which extends the shank of the bolt and with a support surface facing away from the convex surface for a head or nut of the bolt.

13. A handlebar stem according to claim 12, in which the clamping member is designed as a clamping roll and the support surface is formed by the end of a bore coaxial with the aperture, said bore having a diameter, which is adapted for receiving the head of the bolt, said head having an internal recess, such as a hexagonal socket, for tools.

14. A front extension for use as a part of a handlebar stem comprising a passage in an area opposite the end with means for mounting a handlebar, for a bolt to be inserted through a shank of the handlebar stem, said passage being adapted to extend at various selected angles relative to said bolt and said area comprising a surface for fixation of the front extension to the shank of the handlebar stem at an angle corresponding with said selected angle, by tightening said bolt.

* * * * *

UNITED STATES PATENT AND TRADEMARK OFFICE
CERTIFICATE OF CORRECTION

PATENT NO. : 5,331,865
DATED : July 26, 1994
INVENTOR(S) : Willem Oskam

It is certified that error appears in the above-indentified patent and that said Letters Patent is hereby corrected as shown below:

Column 1, line 30, "boll" should read --bolt--.

Column 1, line 44, "such a manner" should read --in such a manner--.

Column 2, line 65, "seem" should read --stem---.

Column 3, line 12, "sloe" should read --slot--.

Column 3, line 37, "bole 8" should read --bolt 8--.

Column 3, line 45, "19" should read --29--.

Column 3, line 64, "Spring" should read --spring--.

Column 6, line 52, ",which" should read --which--.

Column 6, line 56, "passage in" should read --passage, in--.

Signed and Sealed this

Seventh Day of March, 1995

Attest:

BRUCE LEHMAN

*Attesting Officer*   *Commissioner of Patents and Trademarks*